May 26, 1964 R. W. LYNCH 3,134,230
SEAL FOR ELECTRICAL TERMINAL ASSEMBLIES
Filed Feb. 9, 1961
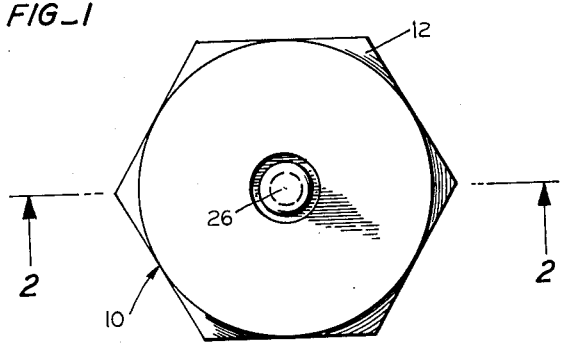
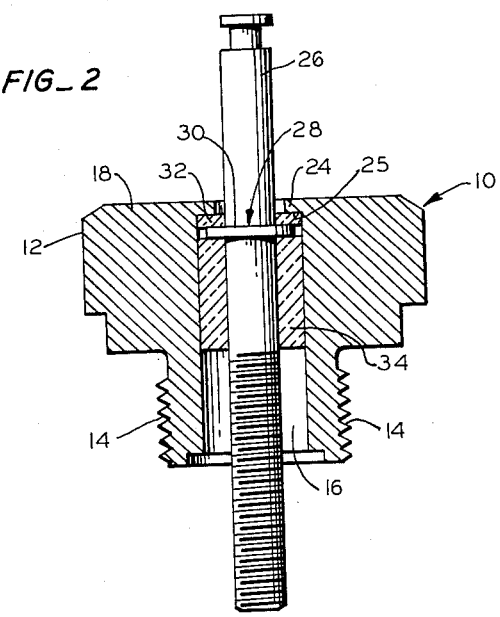
INVENTOR.
ROBERT W. LYNCH
BY
*Naylor & Neal*
ATTORNEYS

United States Patent Office 3,134,230
Patented May 26, 1964

3,134,230
SEAL FOR ELECTRICAL TERMINAL
ASSEMBLIES
Robert W. Lynch, Gilroy, Calif., assignor to McCormick
Selph Associates, Inc., Hollister, Calif., a corporation
of California
Filed Feb. 9, 1961, Ser. No. 88,059
12 Claims. (Cl. 60—39.82)

This invention relates to electric terminal assemblies and more particular to such assemblies which provide an insulated path for conducting electric current through the wall of a body while maintaining said wall hermetically sealed.

Electric terminal assemblies of this type are very useful in electrical ignition systems for initiating high temperature and pressure chemical reactions inside of containers. Typical examples of such utility are found in the construction of pressure bombs in which chemical reactions may be conducted at temperatures as high as 1,000° F. and pressures of 500 atmospheres; such utility is also found in the construction of rocket motors and the like in which electrical igniters are provided for initiating operation of the motors. In these situations the electric terminal assembly generally includes an external metal body in the form of a sleeve adapted to be attached to the high temperature and pressure device, with the sleeve provided with an internal metal core insulated from the sleeve by a body of a dielectric material. The external metal sleeve and the internal metal core are adapted to be connected to the positive and negative sides of the power source to effect electrical ignition inside of the body by means of a power source located outside of the body.

Electrical terminal assemblies used for these purposes in the past have generally employed a body of glass as the dielectric material which is fused in the central conducting core and to the metal sleeve forming the exterior of the assembly to thereby provide insulation between the two metal members and structural support interconnecting them. Such prior art terminal assemblies have been very useful in a number of applications, but have been limited seriously where the assembly is subjected to very high temperatures and where the assembly is required to sustain such pressures for prolonged periods of time.

Thus, in a high pressure reactor or in a rocket motor, the electric terminal assembly may be heated to temperatures on the order of a 1,000° F. and higher and continuously subjected to pressure differentials between its opposite sides on the order of 500 to a 1,000 p.s.i. and higher; such operating conditions often result in softening of the glass insulating material and the formation of small leaks between the metal conductor core and the metal sleeves surrounding it. Even the slightest leak in such systems results in very rapid erosion and "blowout" of the terminal assembly with associated damage to nearby equipment or instruments. This blowout is a substantial hazard when the terminal assembly must withstand the severe operating conditions for substantial periods of time such as those encountered in conducting chemical reactions for periods of five minutes and longer.

Accordingly, it is a principal object of this invention to provide an electrical terminal assembly which will provide an insulated path for electric current through a wall of a body and which will maintain a hermetic seal against the passage of fluids through the wall when the assembly is subjected to very high temperatures and very high differences between the pressures applied to its opposite sides.

It is another object of the invention to provide such a terminal assembly which will maintain a hermetic seal between the components thereof both when the assembly is subjected to normal atmospheric conditions and when the assembly is subjected to such very high temperatures and pressure differentials.

It is another object of the invention to provide such a terminal assembly which will maintain a hermetic seal when it is subjected to high temperatures and pressures for prolonged periods of time and will thereby prevent blowouts caused by erosion through small leaks.

Other objects and advantages of the invention will become apparent in the following description read in conjunction with the attached drawings in which:

FIG. 1 is a top plan view of an electrical terminal assembly constructed in accordance with this invention; and FIG. 2 is a sectional view of the apparatus of FIG. 1 taken on the plane indicated by the line and the arrows at 2—2 of FIG. 1.

Referring now in detail to the drawings, the particular embodiment of the invention shown therein comprises a metal cap 10 having a passageway extending through it, as shown in FIG. 2, and provided with a hexagonal head 12 and external thread 14 by which the body 10 may be rigidly mounted in an aperture in a wall of the device with which it is to be used. When thus mounted in the wall of the device with which it is to be used, the passageway 16 of the body 10 is in communication with the interior of the device and the top 18 of the body is in communication with the exterior of the device. The body 10 is preferably constructed of a very strong high melting material such as various steel alloys known in the art.

The passageway 16 is provided with an internal annular flange 24 which defines an annular seat or shoulder 25 lying generally perpendicular to the axis of the passageway. An elongated cylindrical conductor 26 is mounted in the passageway 16 coaxial therewith and carries an integral external flange 28 which defines an annular seat 30 facing toward the seat 25. The two seats 25 and 30 are substantially parallel to each other and perpendicular to the axes of the passageway 16 and the conductor 26.

A washer 32 is mounted in the passageway 16 between the opposed seats 25 and 30 and has generally flat planar opposed surfaces upon which the seats 25 and 30 rest. To insure the maximum possible operating conditions of the assembly, the opposed surfaces of the washer 32 and the surfaces of the seats 25 and 30 are highly polished and are constructed as nearly as possible to be parallel to each other and perpendicular to the axes of the passageway 16 and the conductor 26. The washer 32 is made of a dielectric material which is structurally strong and has a softening point above the operating temperature of the device with which the terminal assembly is to be used. Any high temperature structural material with adequate dielectric properties (e.g. a dielectric constant of 200 volts per mil) may be used, depending upon the temperature requirements of the assembly. Preferably the material forming the washer 32 has a softening point above 2,500° F. Suitable materials from which the washer 32 can be made are high melting dielectric materials such as sapphire, various plastics, ceramic, etc. A particularly useful material for fabrication of the washer 32 is dense alumina. The strength of the washer 32 should be primarily strengthened to withstand compression, and in this regard it should be noted that the flanges 24 and 28 overlap radially of the passageway 16 so that forces applied by the seats 25 and 30 on the washer 32 tend to compress the washer 32. It should also be noted that the diameter of the washer 32 is preferably made very slightly smaller than the diameter of the passageway 16 to permit insertion of the washer therein, but the washer 32 is preferably large enough that it supports the conductor 26 laterally and prevents contact between the conductor 26 and the body 10.

A sleeve 34 formed of a dielectric material is positioned in the passageway 16. The sleeve 34 is formed of a suitable material such as the glasses used in the above-mentioned prior art devices which have softening points substantially below the softening point of the washer 32 and preferably below about 1500° F. Potting materials such as epoxy resins, and the like, may be employed. Preferably, the material of the sleeve 34 is hermetically sealed to the sides of the conductor 26 and the interior walls of the passageway 16; the sealing may be effected by the use of an auxiliary adhesive but is conveniently effected by fusing the sleeve 34 to the conductor 26 and the walls of the passageway 16 by means of heat. In this regard it should be noted that the electric terminal assemblies of this invention are most easily fabricated by preforming the body 10 with its passageway 16 therein and then inserting the washer 32 and conductor 26 therein; the sleeve 34 is then inserted in place in the form of a short tubular section of glass, etc., and the entire device is fired to a suitable temperature at which the glass will fuse to adjacent metal surfaces.

When the assembly illustrated in the drawing is employed as an electrical terminal assembly in devices such as those described above, the assembly is rigidly mounted in an aperture in the wall of the device with which it is used, and the assembly maintains an efficient hermetic seal at room temperatures in the wall by reason of the provision of the sleeve 34 fused to the conductor 26 and the walls of the passageway 16. When an electrical potential difference is applied between the exposed end of the conductor 26 and the body 10 to ignite a material, rapid increases in the temperature and pressure of the ignited material will cause the material forming the sleeve 34 to soften and form a viscous fluid piston exerting its pressure against the flange 28 on the conductor 26 and against the washer 32. At the same time the pressure forces the condutcor 26 against the washer 32 to apply very high pressure to the interfacial surfaces between the seats 25 and 30 and the washer 32. The pressure on the viscous material of the sleeve 34 will force the viscous material into any spaces in the interfacial areas between the washer 32 and seats 25 and 30 and will also force the fluid into any pores in the washer 32. The viscosity of the fluid will prevent its rapid extrusion from the assembly, thus providing a hermetic seal to the terminal assembly even when the temperature and pressure of the ignited materials are very high and are maintained for substantial periods of time.

The terminal assemblies constructed in accordance with this invention are capable of withstanding temperatures of 1,800° F. and higher, coupled with pressure differentials between the opposite ends of the conductor 26 of 1,000 pounds per square inch and higher.

While one specific embodiment of this invention has been illustrated and described in detail herein, it will be obvious to those skilled in the art that modifications in the structure and composition of materials disclosed may be made without departing from the spirit and scope of the invention.

I claim:

1. An electrical terminal assembly adapted to conduct electric current to the interior of a container and maintain said container hermetically sealed around said terminal assembly when the contents of the container effect a very high operating temperature and a very high operating pressure on said assembly which comprises: a body adapted to define a portion of a wall of a container, with one side of said body in communication with the interior of said container and with a second side of said body communicating with the exterior of said container, said body having a passageway extending therethrough from said one side to said second side with a constricted portion defining a first seat facing toward said one side of said body, an electrical conductor positioned in said passageway extending from said one side to said second side of said body and having a second seat thereon facing toward said first seat, a rigid fluid impervious insulator washer constructed of a dielectric material having a softening point above said operating temperature and a structural strength sufficient to withstand said operating pressure with said washer having opposed faces which embrace said seats along face sealing areas which extend completely around said conductor, and a sleeve positioned between said conductor and the walls of said passageway in an area between said washer and said first side of said body and supporting said conductor and said insulator washer in assembled relation with said body with said sleeve constructed of a material which is incapable of withstanding said operating temperature and pressure conditions and yields at said operating temperature and pressure conditions to permit high pressure sealing of said assembly along face sealing areas by transmission of force from said conductor to said body through said insulator washer while said conductor is free to move in said passageway.

2. The terminal assembly of claim 1 in which the material of said sleeve is hermetically bonded to said conductor and the walls of said passageway.

3. The terminal assembly of claim 2 in which said first and second seats overlap radially of said passageway.

4. The terminal assembly of claim 2 in which said passageway and said conductor have generally cylindrical shapes and said seats are substantially parallel to each other and are substantially perpendicular to the axes of said passageway and said conductor.

5. The terminal assembly of claim 2 in which said sleeve is constructed of a thermoplastic dielectric material which is adherent to metal surfaces and which is a viscous fluid at said operating temperature.

6. The terminal assembly of claim 5 in which said sleeve is formed of glass, and said washer is formed of a ceramic material containing alumina as a major constituent.

7. An electrical terminal assembly for igniting pyrotechnic devices such as rocket motors and the like in which the assembly is subjected to high temperatures and pressures for prolonged periods of time which comprises: a rigid metal body, means on said body for rigidly mounting said body on a pyrotechnic device with one side of said body in communication with the exterior of said device and the other side of said body in communication with the interior of said device and positioned to receive heat and pressure from said pyrotechnic device, said body having an elongated passageway therethrough extending from said one side to said other side thereof with a constriction in said passageway adjacent to said one side thereby defining a first seat remote from and facing toward said other side of said body, an elongated electrical conductor positioned in said passageway spaced from the walls thereof and extending between said sides of said body, said conductor having a flange thereon adjacent to said first side of said device and defining a second seat facing toward said first seat and remote from said other side of said body with said flange having a maximum diameter which is greater than the diameter of said passageway at said constriction and less than the minimum diameter of said passageway between said first seat and said other side of said body, a substantially rigid washer positioned between and contacting said seats, said washer being constructed of a structurally strong dielectric material the softening point of which is above about 2500° F., and a sleeve constructed of a normally rigid dielectric material having a softening point below about 1500° F. positioned in said passageway between said washer and said other side of said body whereby the application of high temperatures and pressures to said other side of said body effects softening of said sleeve and hermetic sealing of the space around said washer and said seats by flow of plastic material from said sleeve.

8. The terminal assembly of claim 7 in which the material of said sleeve is hermetically bonded to said conductor and to the walls of said passageway.

9. The terminal assembly of claim 8 in which said passageway and said conductor have generally cylindrical shapes and said seats are substantially parallel to each other and substantially perpendicular to the axis of said passageway and said conductor.

10. The terminal assembly of claim 8 in which said sleeve is formed of a thermoplastic dielectric material.

11. The terminal assembly of claim 10 in which said sleeve is constructed of glass, and said washer is constructed of a ceramic material containing alumina as a major constituent.

12. An electrical terminal assembly for the ignition systems of pyrotechnic devices such as rocket motors and the like in which the assembly is subjected to high temperatures and pressures for prolonged periods of time which comprises: a rigid metal body threaded externally to be mounted in a wall of a pyrotechnic device with one side of said body communicating with the interior of said device, said body having an elongated generally cylindrical passageway extending therethrough from said one side and having an annular shoulder in the wall thereof remote from and facing toward said one side of said body, said shoulder lying in a plane generally perpendicular to the axis of said passageway, an elongated generally cylindrical electrical conductor extending through said passageway spaced from the walls thereof and having an annular shoulder thereon facing toward and radially overlapping the minimum diameter of said passageway between said shoulder on said conductor having a diameter less than the minimum diameter of saidp assageway between said shoulder on said body and said one side of said body, the opposed faces of said shoulders being parallel, a substantially rigid washer constructed of a structurally strong dielectric material having a softening point above about 2500° F. positioned between and contacting said shoulders, and a sleeve constructed of a normally rigid dielectric material having a softening point below about 1500° F. positioned in said passageway between said washer and said one side of said body and hermetically bonded to said conductor and the wall of said passageway whereby the application of high temperatures and pressures to said one side of said body effects softening of said sleeve and hermetic sealing of the interfacial spaces around said washer by flow of plastic material from said sleeve.

References Cited in the file of this patent
UNITED STATES PATENTS

| | | |
|---|---|---|
| 1,963,714 | Nowosielski | June 19, 1934 |
| 2,136,467 | Rhode | Nov. 15, 1938 |
| 2,874,321 | Summerer | Feb. 17, 1959 |
| 2,959,703 | Hastings | Nov. 8, 1960 |